July 9, 1929.  F. W. REIMOLD  1,720,608
TRACTION PLOW
Filed Aug. 22, 1927  3 Sheets-Sheet 1
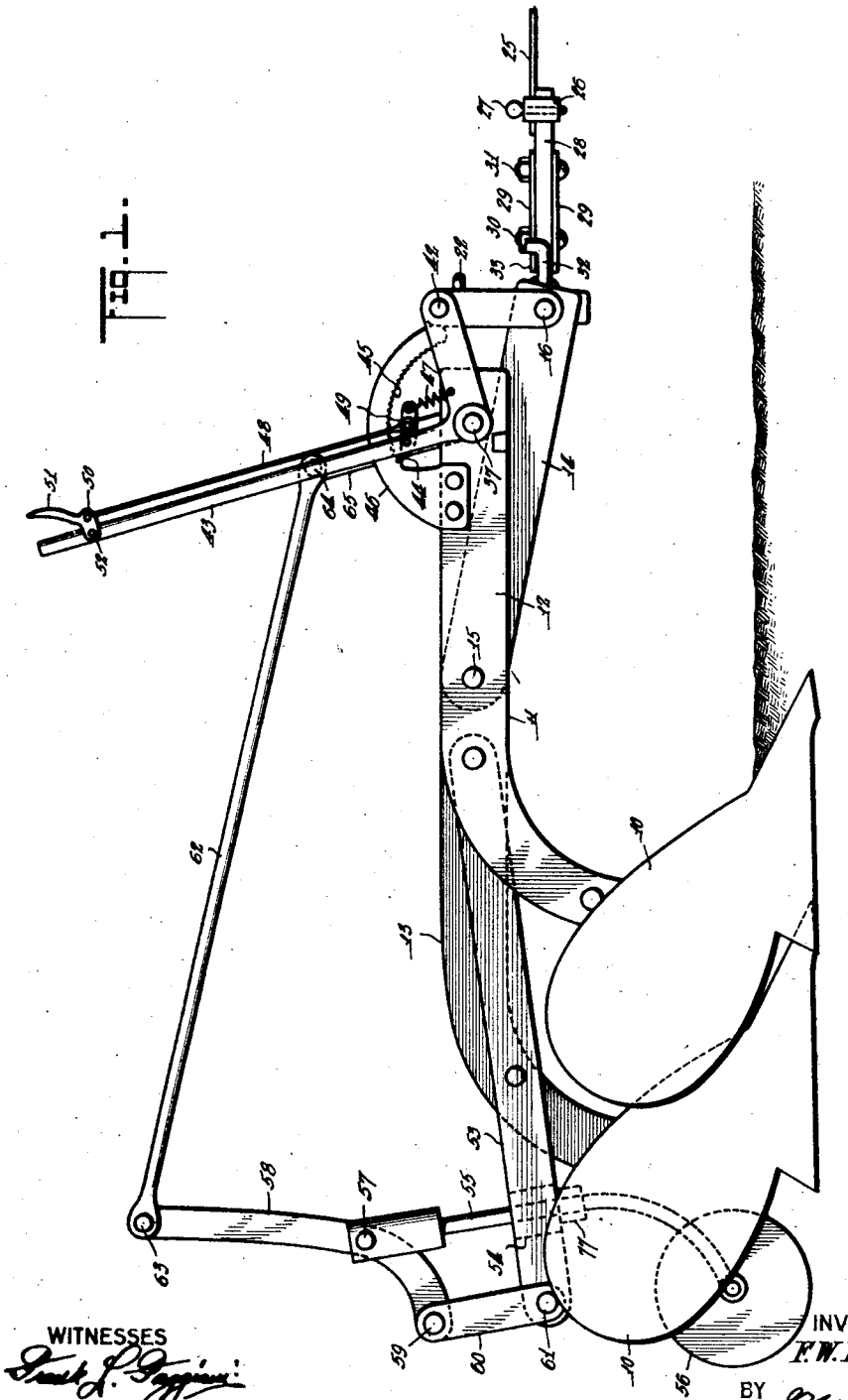
INVENTOR
F. W. Reimold

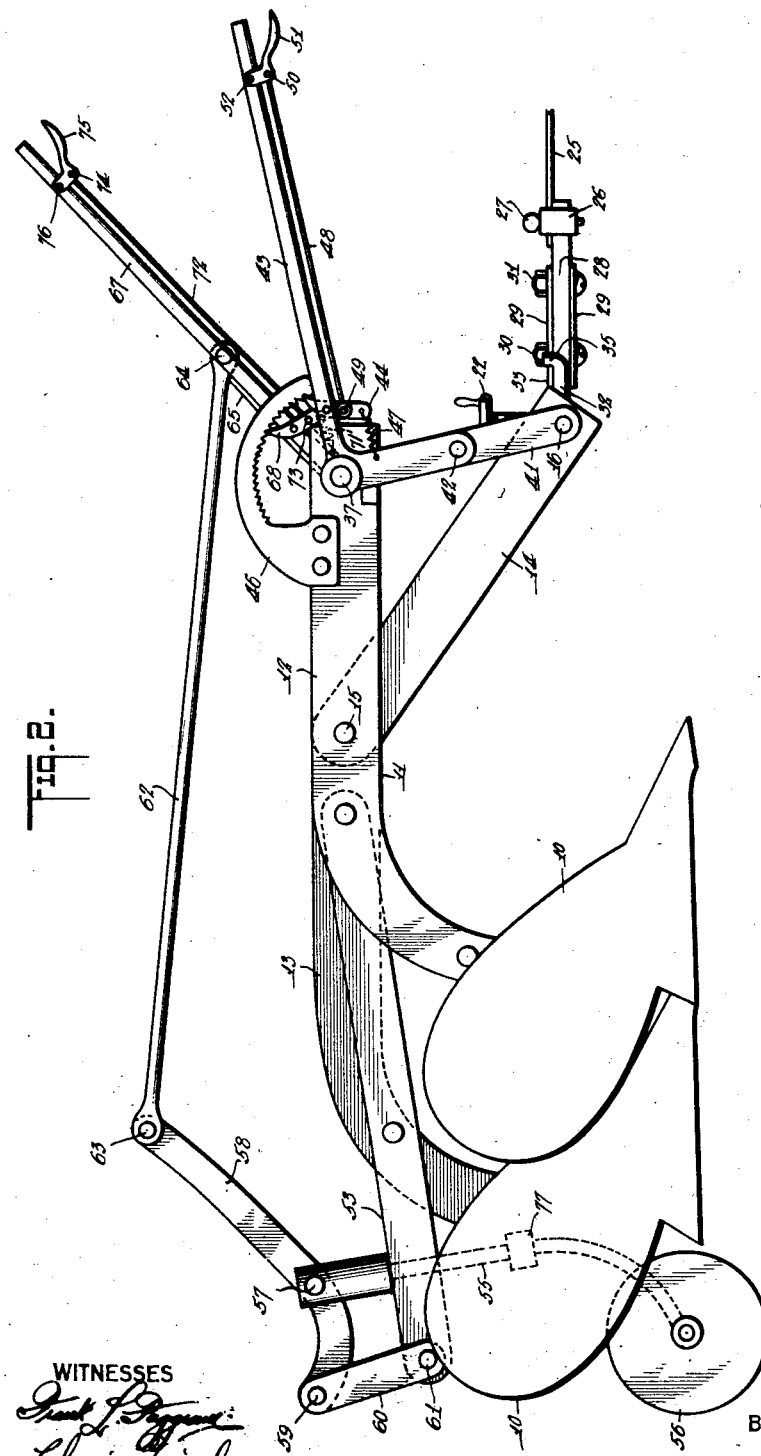

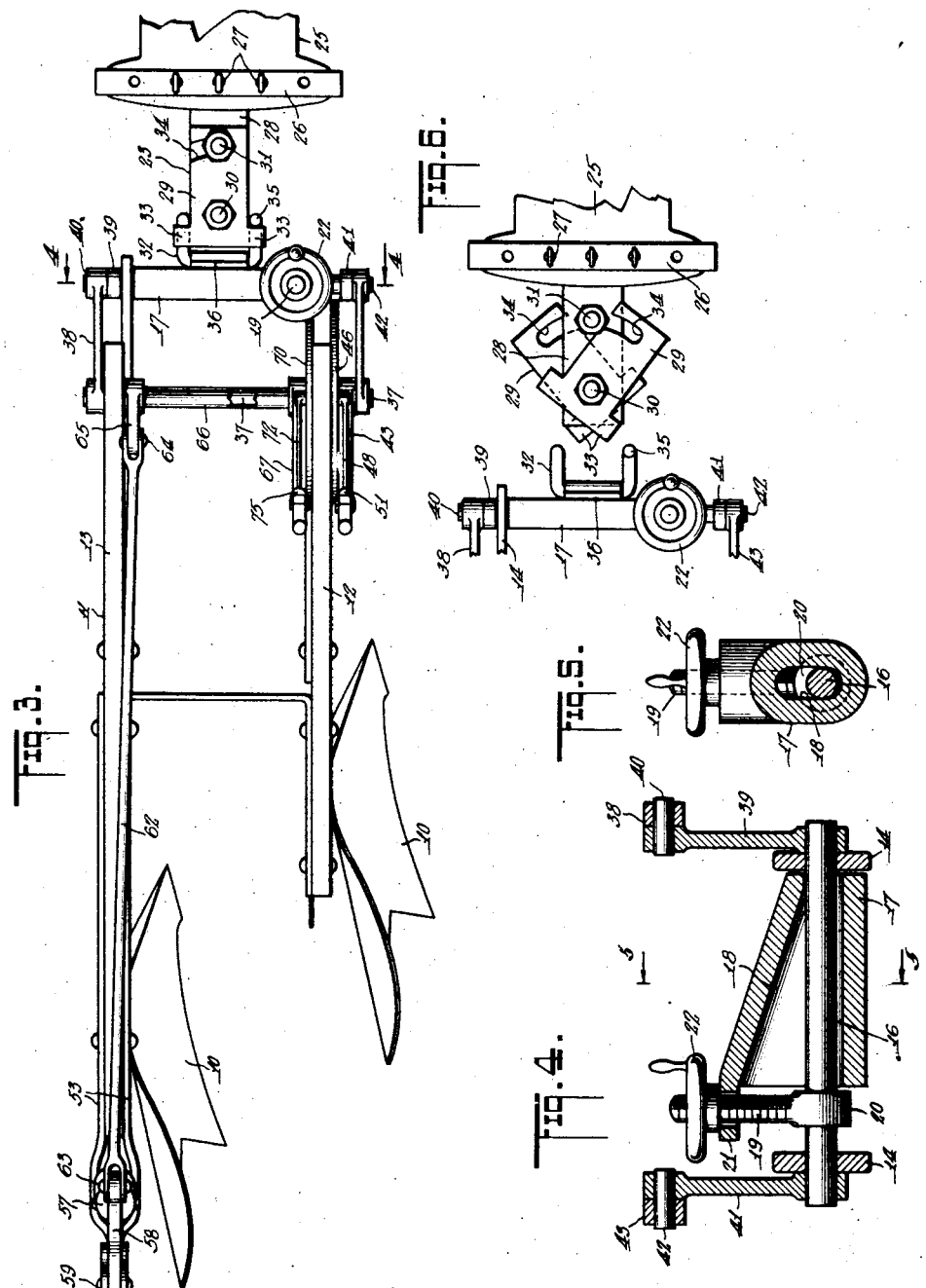

Patented July 9, 1929.

1,720,608

UNITED STATES PATENT OFFICE.

FRED W. REIMOLD, OF NEW YORK, N. Y.

TRACTION PLOW.

Application filed August 22, 1927. Serial No. 214,644.

This invention relates to plows, and has especial reference to plows adapted to be connected with a power driven tractor.

The principal object of the present invention is to provide a plow of the indicated character embodying improved features whereby the desired adjustment may be made for obtaining the desired depth of furrows, for leveling the plows to compensate for irregularities in the surface of the land, for moving the plows into and out of contact with the land or soil, and for releasing the implement in its entirety when subjected to an unusual pulling force in consequence of the plow points encountering obstructions.

The nature of the invention and its distinguishing features and advantages will appear when the following specification is read in connection with the accompanying drawing, in which Figure 1 is a side elevation of the implement embodying the present invention and showing the plows down for cutting furrows.

Fig. 2 is a side elevation of the implement showing the plows up off the ground in position to permit the implement to be readily drawn over the surface of the ground.

Fig. 3 is a plan view of the implement with the parts in the positions shown in Fig. 1.

Fig. 4 is an enlarged detail sectional view taken on the line 4—4 of Fig. 3.

Fig. 5 is a sectional view on the line 5—5 of Fig. 4.

Fig. 6 is a view illustrating the manner in which the implement is released from the tractor.

Referring now more particularly to the drawings it will be apparent that the implement includes plows 10 of any preferred type which are connected with a suitable frame 11 presenting connected beams 12 and 13, the said plows 10 being connected respectively with the beams 12 and 13 in any preferred manner, and one plow being arranged a suitable distance in advance of the other plow. Connected with the beams 12 and 13 respectively are members or arms 14, each being pivotally connected as at 15 at one end with its related beam, and the opposite ends of the arms 14 carry a shaft 16. A block 17 is arranged on the shaft 16, the said block having an opening 18 which is tapered for the purpose of accommodating the said shaft 16, as shown most clearly in Fig. 4. A screw 19 is loosely connected with the shaft 16, as at 20, and extends through a lug 21 on the block 17. A hand wheel 22 cooperates with the screw 19 and the lug 21 for changing the position or angular disposition of the shaft 16 with respect to the block 17 upon the manipulation of the hand wheel 22, for the purpose of leveling the plows 10, it being understood that the block 17 will be relatively fixedly connected.

Releasing means 23 is arranged between the block 17 and a clevis 24. The clevis 24 may be of any preferred construction for connection with a part of a motor driven tractor. In the present instance the clevis 24 consists of a plate 25 having a series of holes therein, and a bar 26 having a series of holes for the accommodation of suitable pins 27 which extend through the holes in the bar 26 and plate 25 to obtain the desired draft. The said releasing means 23 consists of a member 28 connected at one end with the bar 27, plates 29, studs 30 and 31, and a coupling 32. Each of the plates 29 is similar in construction and is provided with lateral lugs 33 at one end, and an arcuate notch 34 at the opposite end. The said plates 29 are arranged respectively at the top and bottom sides of the member 28 and are retained in place for pivotal movement by the stud 30. The other stud 31 is carried by the member 28 and the opposite ends thereof are respectively disposed in the notches 34 in the plates 29. The coupling 32 is substantially of U-shape and has oppositely directed terminals 35. The coupling 32 is connected with the block 17 by a strap 36. One of the terminals 35 of the coupling 32 is adapted to engage one of the lugs 33 of the upper plate 29, and the other terminal 35 is adapted to engage one of the lugs 33 of the lower plate 29. It will be apparent that terminals 35 are disposed respectively at opposite sides of the member 28. The arrangement of parts is such that when the implement is subjected to an unusual pulling force, the plates 29 will move on the pivot afforded by the stud 30 causing movement of the plates 29 in opposite directions, and consequent disengagement of the terminals 35 with the lugs 33, thereby releasing the implement, as shown most clearly in Fig. 6. The stud 31 serves as a stop to limit the movement of the plates 29 in one direction. It will be apparent that when two of the lugs 33 become worn, the remaining two lugs 33 may be employed in conjunction with the coupling terminals 35 thereby prolonging the life of the plates 29.

In order to obtain the desired disposition or adjustment of the points of the plows 10 for obtaining the proper or desired depth of furrows there is provided means presently to be described. Extending transversely of the beams 12 and 13 is a shaft 37. The opposite ends of the shaft 27 project through the beams 12 and 13 respectively. One end of the shaft 37 is connected with one end of the shaft 16 by links 38 and 39 which are respectively pivotally connected with the ends of the shafts 16 and 37, and which are pivotally connected together as at 40. It will be apparent that the links 38 and 39 are arranged at one side of the frame 11. At the opposite side of the frame 11 there is a link 41 pivotally connected with the shaft 16 and the opposite end of said link 41 is pivotally connected as at 42 with a hand lever 43 having the related end of the shaft 37 as a fulcrum. Arranged for pivotal movement on the lever 43 is a dog 44 one end of which is engageable with any one of a series of teeth 45 formed on a sector 46 secured to the beam 12. A spring 47 has one end connected with a portion of the lever 43 and the opposite end thereof is connected with the dog 44 and serves for releasably holding the dog in engagement with one of the teeth 45. The dog 44 is manually operable by provision of a rod 48 pivotally connected at one end, as at 49 with the dog 44, and the opposite end thereof is pivotally connected as at 50 with a hand grip 51, pivotally connected as at 52 with the upper end of the lever 43.

In order to raise the plows 10 a considerable distance above the surface of the ground for transporting the implement there is provided means presently to be described. Arranged on the beam 13 are rigid members 53 which carry a bearing 54. A rod 55 is guided for up and down movement in the bearing 54. The lower curved end of the rod 55 is connected with a ground wheel 56, and the upper end of the rod 55 is pivotally connected as at 57 with a link 58. One end of the link 58 is pivotally connected as at 59 with members 60, each of which is pivotally connected as at 61 with the rigid members 53. A rod 62 is pivotally connected at one end as at 63 with the link 58, and the opposite end of said rod 62 is pivotally connected as at 64 with an arm 65 rigidly connected with a hollow shaft 66 which surrounds the shaft 37. A hand lever 67 is rigidly connected at one end with the shaft 66. Arranged for pivotal movement on the lever 67 is a dog 68 which is engageable with any one of a series of teeth 69 formed on a sector 70 secured to the beam 12. The dog 68 is under the influence of a spring 71 one end of which is connected with a portion of the lever 66 and the opposite end thereof is connected with the dog 68. The spring 71 serves to hold the dog 68 releasably engaged with one of the teeth 69. A rod 72 is pivotally connected at one end as at 73 with the dog 68, and the opposite end is pivotally connected as at 74 with a hand grip 75 pivotally connected as at 76 with the upper end of the lever 67. When the lever 67 is moved forwardly to the position shown in Fig. 2, the shaft 66 will be caused to turn, causing the arm 65 to move with it, the arm 65 in turn exerting a pull on the rod 62 which effects the pivotal movement of the link 58, and through the intervention of the member 60 the rear ends of the rigid members 60 will be raised causing the frame 11 and the plows 10 connected therewith also to be elevated a considerable distance above the surface of the ground, as shown most clearly in Fig. 2. The dog 68 on the lever 67 serves to hold the plows in their raised positions. When the dog 68 is released by manipulating the hand grip 75, the frame 11 and the plows 10 carried thereby will lower under their own weight into contact with the ground, the plows 10 being limited in their downward movement by a stop 77 on the rod 55. This is so because the bearing 54 carried by the members 53 encounters the stop 77. The plows 10 are then down in position for cutting furrows.

By manipulating the hand lever 43, that is to say, by moving the lever 43 forwardly from the position shown in Fig. 1 the front end of the frame may be lowered, and as a consequence the points of the plows 10 may be disposed to any desired positions for cutting furrows of the desired depth.

From the foregoing it should also be apparent that by manipulating the hand wheel 22 the plows 10 may be canted or tilted to any desired degree to compensate for changes in the surface of the ground or soil. Furthermore, when the road wheels at one side of the tractor run in a furrow, the hand wheel 22 may be manipulated to level the plows.

I claim:

1. An agricultural implement including a frame, plows connected with said frame, a shaft arranged on the front end of said frame disposed transversely thereof, a draft block through which said shaft extends, and means operable to tilt said shaft relatively to said block, for the purpose of leveling said plows.

2. An agricultural implement including a frame, plows connected with said frame, a shaft connected with the frame and arranged transversely of the front end thereof, a draft block, and means connected with said block and said shaft to tilt the shaft relatively to said block, for the purpose of leveling the plows.

3. An agricultural implement including a frame, plows connected with said frame, a shaft connected with the frame and arranged transversely of the front end thereof, a draft block, a threaded member connected with said shaft near one end thereof, and a manipulator adapted to co-act with said threaded member and a portion of said block, said manipulator when actuated serving to effect the adjustment of said shaft relatively to said block, for the purpose of leveling said plows.

Signed at New York, in the county of New York and State of New York, this 19th day of August, A. D. 1927.

FRED W. REIMOLD.